J. C. DUNER.

SAND BOX FOR CARS.

APPLICATION FILED OCT. 21, 1909.

Reissued Dec. 28, 1909.

13,063.

2 SHEETS—SHEET 1.

WITNESSES

Ed. C. Kavern

Maurice Goldberger.

INVENTOR

John C. Duner by Attorneys

Dynes, Tredt & Carpenter

ANDREW B. GRAHAM CO., PHOTO-LITHOGRAPHERS, WASHINGTON, D. C.

J. C. DUNER.
SAND BOX FOR CARS.
APPLICATION FILED OCT. 21, 1909.
Reissued Dec. 28, 1909.
13,063.
2 SHEETS—SHEET 2.
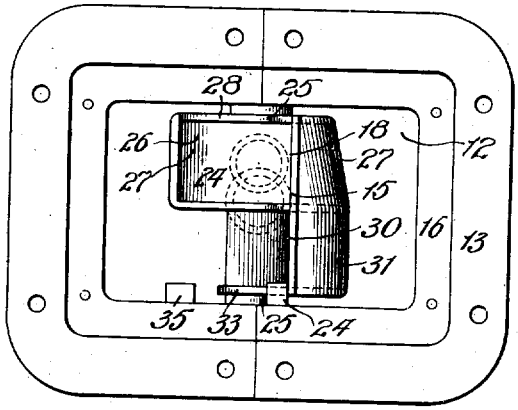
Fig. 3
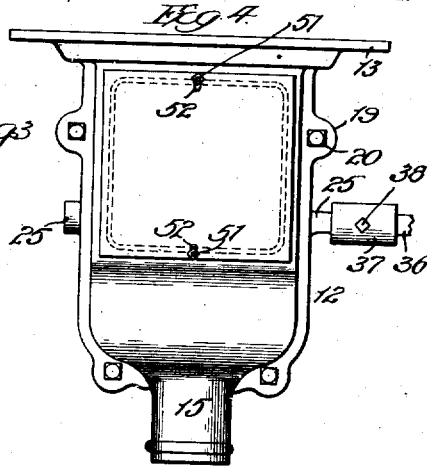
Fig. 5.
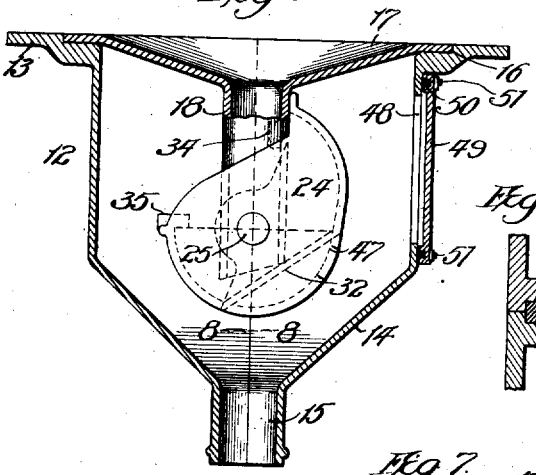
Fig. 6.
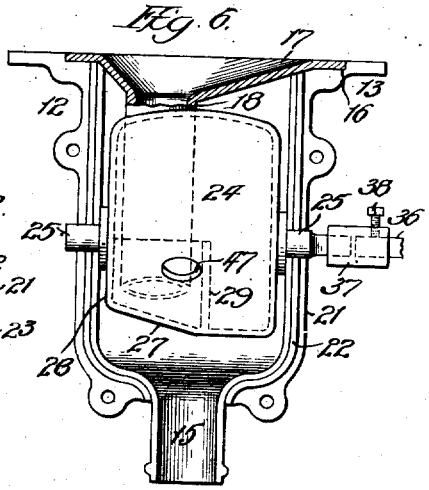
Fig. 8.
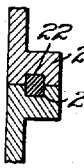
Fig. 7.
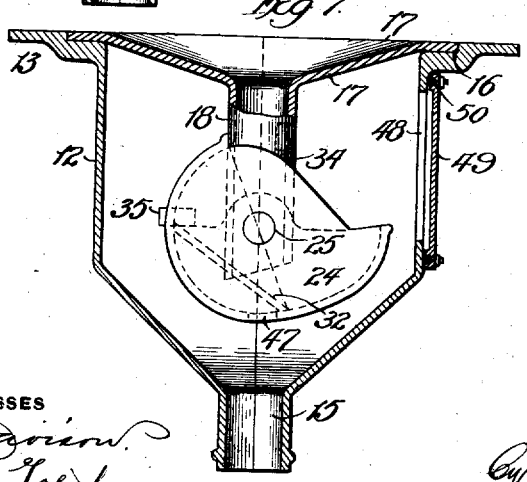
Fig. 9.
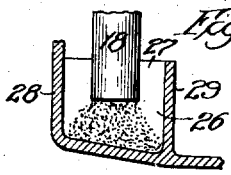
WITNESSES
Ed. C. Davison
Maurice Goldberg.
INVENTOR
John C. Duner
by Attorneys
Symmes Redt & Carpenter
ANDREW. B. GRAHAM CO., PHOTO-LITHOGRAPHERS, WASHINGTON, D. C.

UNITED STATES PATENT OFFICE.

JOHN C. DUNER, OF CHICAGO, ILLINOIS.

SAND-BOX FOR CARS.

13,063. Specification of Reissued Letters Patent. Reissued Dec. 28, 1909.

Original No. 639,891, dated December 26, 1899, Serial No. 716,255. Application for reissue filed October 21, 1909. Serial No. 523,936.

*To all whom it may concern:*

Be it known that I, JOHN C. DUNER, of Chicago, in the county of Cook and State of Illinois, have invented certain new and useful Improvements in Sand-Boxes for Cars, of which the following is a specification.

This invention relates to sand-boxes for cars, being more particularly adapted for use upon street-railway cars, and has for its object to provide a construction whereby clogging of the sand may be avoided and certainty of operation of the sanding apparatus thus insured.

My invention has for a further object to provide an apparatus of this character which is adapted for use either above or below the floor of the car, its construction and arrangement being such that it may be employed in the latter position without permitting access of water to its interior, and thereby wetting the sand and causing the same to clog and cease to flow.

A further object of my invention is to provide a construction adapted for use in simultaneously supplying sand to both tracks without requiring the exertion of too much force on the part of the operator.

Further objects of the invention are the production of an apparatus which may be readily adapted for use either as a continuous-feeding apparatus or as an intermittently feeding one and the simplification and increase of efficiency in the mechanism by means of which motion is imparted to the sanding apparatus proper by the operator.

To these ends my invention consists in certain novel features, which I will now proceed to describe and will then particularly point out in the claims.

Figure 1:
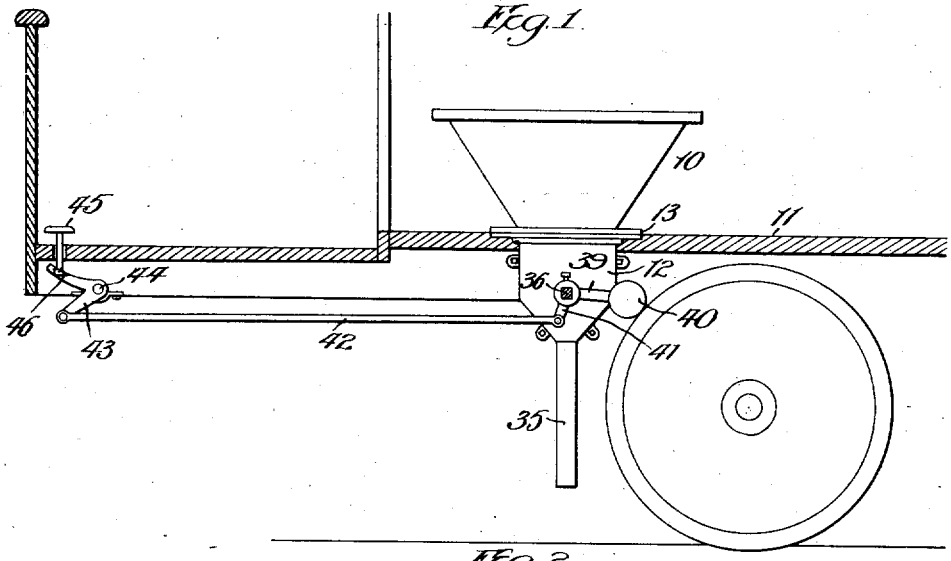
Figure 2:
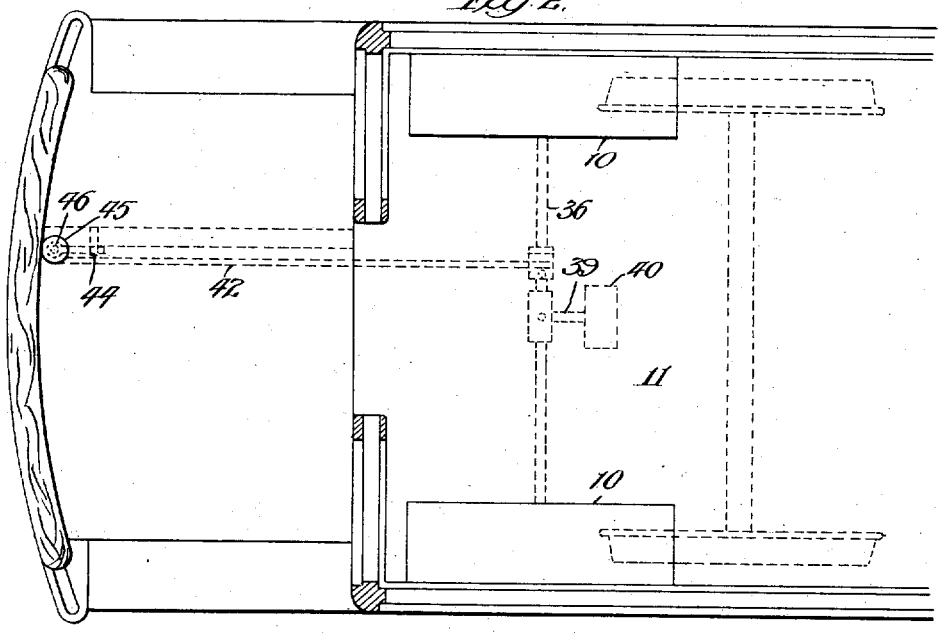

In the accompanying drawings, Figure 1 is a vertical sectional view of one end of a street-car having my invention applied thereto; Fig. 2 is a plan section of the same; Fig. 3 is a plan view of the valve and valve-casing with the hopper detached; Fig. 4 is an end elevation of the same; Fig. 5 is a longitudinal sectional view, the valve being shown in elevation; Fig. 6 is an end view with one-half of the valve-casing removed; Fig. 7 is a view similar to Fig. 5, showing the valve in another position; Fig. 8 is an enlarged detail sectional view taken on the line 8 8 of Fig. 5, and Fig. 9 is a detail sectional view of the feed-pipe and the adjacent portion of the valve-pocket, the latter being shown in section and the sand being shown in the position which it occupies during the operation of the device.

Referring to said drawings, 10 indicates the hopper or reservoir in which the sand is stored and which in the present instance is shown in Figs. 1 and 2 as located above the car-floor, which is indicated at 11. Two of these hoppers are employed, located one on each side of the car, as shown in Fig. 2. The construction on each side of the car being, however, substantially the same, I shall describe in detail only one of the sand-boxes, it being understood that the same description is equally applicable to the other. Below each hopper 10 is located a valve-chamber 12, provided with a flange 13 at its top, by means of which it may be secured either to the base of the hopper 10 or to the floor of the car, as desired. This valve-chamber is provided with a hopper bottom 14 and a discharge spout or passage 15 of any approved construction. The upper portion of the valve chamber is provided with a rabbeted seat 16, in which is seated the margin of a plate 17, which is of a funnel or hopper shape as to its upper portion, while its lower portion forms a feeding-tube or passageway 18. This plate 17, together with the top flange 13 of the valve-chamber, may form the bottom of the hopper or reservoir, if desired, or the hopper or reservoir may be so located as to discharge into the receptacle formed by the funnel-shaped portion of the plate 17. The valve-casing 14 is preferably formed in two parts, being divided transversely or in a vertical plane passing through the axis of the valve, the meeting edges being provided with apertured lugs 19 to receive the bolts 20, which secure the two halves of the box together. In order to make a tight joint between the two sections and prevent the escape of sand or the entrance of water, each meeting edge is provided with a projecting rib 21, having a groove 22 in that one of its faces which abuts against the adjacent rib, and a suitable packing 23 is inserted in the space formed by the meeting of these grooved ribs, as indicated in detail in Fig. 8 of the drawings.

The valve is indicated as a whole by the reference-numeral 24 and is provided with suitable trunnions 25, adapted to turn in suitable bearings in the valve-casing. The main portion of the valve consists of a cup-shaped portion or pocket 26, which is defined by a curved bottom 27 and vertical sides 28 and 29. The curved bottom is struck from the axis of the trunnions 25 as a center, and extends for about three-quarters of a circle, or two hundred and seventy degrees, and the vertical wall 28 is of about the same extent, while the vertical wall 29 in the particular form of construction shown is given approximately the form of a semicircle, so that when the valve is in its normal or closed position the upper edge of said wall or partition is substantially horizontal, as indicated in dotted lines in Fig. 5. Adjacent to the pocket 26 is a second pocket 30, defined by a bottom, part of which is curved, as indicated at 31, beginning at the uppermost portion of the bottom 27 and forming substantially a lateral continuation of the same, the remainder of the bottom being straight, as indicated at 32. The sides of the pocket 30 are defined by the vertical partition 29 and a second partition 33, so that the pocket 30 is in continuous or open connection with the pocket 26 at one end and separated from it by the partition 29 at the other end, said pocket 30 extending from what is the uppermost point of the valve when in its normal position to a point about diametrically opposite the same. The bottom 27 of the pocket or cup-shaped portion 26 of the valve is preferably laterally inclined, as shown, for the purpose hereinafter described. The feed-pipe 18 extends downward into the cup-shaped portion or pocket 26 of the valve in a line passing centrally through the axis thereof, but does not extend entirely to the bottom thereof, a space being left between the lower end of said pipe and the curved bottom of the valve, as clearly shown in the several figures of the drawings, and the end of the feed-pipe is inclined, as shown. The valve has an oscillating movement through a range of about ninety degrees, and in order to limit this movement there are provided stops 34 and 35. In its normal or closed position which is that shown in Figs. 3, 5, and 6 of the drawings, the valve is in contact with the stop 34 while in its opposite or open position the valve is in contact with the stop 35, as shown in Fig. 7 of the drawings.

The valves thus constructed may be operated in any suitable manner; but I prefer to employ for this purpose the operating mechanism shown and which I have devised. This comprises a transverse shaft 36, the ends of which are connected by couplings 37 with the trunnions 25 of the two valves on opposite sides of the car. As a simple and effective connection I provide the shaft and trunnions with squared or polygonal ends and employ as a coupling a sleeve having a similarly squared or polygonal aperture therethrough to fit upon the meeting ends of the shaft and trunnions, a set-screw 38 being employed to secure each sleeve to the shaft. The shaft 36 is also provided with a radial arm 39, carrying a weight 40, which tends to hold the valves closed or in their normal position, as shown in Figs. 3, 5, and 6. The shaft 36 is also provided with a second radial arm 41, to which is connected an operating-rod 42, extending to the platform or other point where the operator is stationed, at which point it is connected to one arm of a bell-crank lever 43. This bell-crank lever is pivoted at 44 on the car-frame, and its other arm is located in the path of an operating-pin 45, which extends through the car-floor in the usual manner and is adapted to be operated by pressure exerted by the foot of the operator. At the point where the pin 45 bears upon the bell-crank lever 43 the arm of this latter is inclined upward and outward in a direction away from its pivotal axis as indicated at 46.

The apparatus thus described operates in the following manner: The hopper or reservoir being filled with dry sand, this latter will flow downward through the feeding-pipe 18 and into the cup or pocket 26 of the valve. The lower end of the feed-pipe extends below the upper margin of the cup or pocket so that as the sand flows from the feed-pipe when it rises to a sufficient height in the cup or pocket it will close and seal the mouth of this latter and prevent any further escape of the sand, as indicated in Fig. 9 of the drawings. When it is desired to supply sand to the track, the valves are oscillated through the medium of the operating mechanism provided for that purpose, whereupon the sand will flow by gravity into those portions of the two pockets 26 and 30 which are in direct lateral communication with each other, and the sand will thus be permitted to pass from the pocket 26 into the pocket 30. It will be observed that when the parts are in the normal position (shown in Figs. 3, 5, and 6) the upper edge of the partition or wall 29 is substantially horizontal, and since the sand always occupies the lowest portion of the pocket in which it lies said partition prevents the sand from passing from the pocket 26 into the pocket 30 when the valve is in this position. When, however, the valve is moved into the position shown in Fig. 7, the sand flows by gravity into that part of the pocket 26 which has now become the lowest part of the valve and since the partition 29 does not extend far enough to cut off communication between the pockets 26 and 30 at this point, which is now lowermost, there is obviously nothing to prevent the sand from flowing from the pocket 26 into the pocket 30, and it does therefore so flow and pass into said pocket 30. When the bottom 27 of the pocket 26 is inclined in the manner shown and described, the passage of the sand from one pocket to the other is facilitated in an obvious manner. The inclination of the bottom 27 of the pocket 26 insures the passage of all of the sand from the pocket 26 into the pocket 30; but of course, since the partition does not extend between the two pockets at this point, when said point is lowermost a sufficient portion of the sand will flow from the one pocket to the other whether the bottom of the pocket 26 be inclined or not. During this motion of the valve any excessive flow through the feed-pipe 18 is prevented by the fact that the end of said pipe is always inclosed in the pocket 26 during the whole of the movement of the valve. Upon the release of the operating mechanism the valve is returned from the position shown in Fig. 7 to that shown in Figs. 3, 5 and 6, and the sand which previously passed from the pocket 26 into the pocket 30 is discharged from the pocket 30 into the valve-chamber 14 and thence through the discharge-pipe 15 to the track.

The valve as thus constructed and operated provides for an intermittent feeding of the sand from the hopper to the track, a definite quantity of sand being delivered at each complete movement or oscillation of the valve. Clogging of the sand in the feed-pipe is prevented by reason of the fact that no part of the valve is in contact with the feed-pipe or its discharge-opening, a considerable space being left between the two so that the tendency to clog which exists when the feed-pipe is positively closed by a valve or cut-off in direct contact therewith is entirely avoided. Moreover, the valve in moving carries the sand positively away with it in such a manner as to break up any packed or clogged mass which may form at the mouth of the feed-spout, this result being furthered by the inclination of the extremity of the feed-pipe in the manner set forth. The return movement of the valves is effected just as readily as their opening movement and without requiring any great amount of power and by reason of this fact a comparatively small weight is sufficient to return the valves to their normal position. This ease of movement of the valves renders it possible to connect the sand-boxes on each side of the car to a single operating mechanism, so that they may be simultaneously operated without too great a demand upon the strength of the operator.

The particular construction of the apparatus is such, the valves being entirely inclosed and protected and the valve-chamber having water-tight joints, that the apparatus may be used either with a sand-box located above the car-floor or with one located below the floor. This is of particular advantage for the reason that while it is sometimes desirable to locate the valve and its mechanism below the floor these portions of the apparatus as heretofore constructed have permitted the entrance of water, to which they are particularly exposed when located below the floor of the car, and such admission of water has, by wetting the sand, prevented its flow and clogged the apparatus. The particular form of operating mechanism set forth is simple, efficient, and easily assembled or taken apart. The particular arrangement of the bell-crank lever whereby its extremity presented to the operating-pin is normally inclined thereto is advantageous in that when said pin and extremity have been depressed and the pressure is released the weight in operating through the lever to raise the pin exerts its pressure squarely against the pin or at right angles to the longitudinal axis thereof, thus insuring the lifting of the pin and preventing any binding between the pin and its housing and the lever.

The apparatus as thus constructed is devised, as hereinbefore set forth, for the production of an intermittent feed, supplying a definite quantity of sand each time the operating-pin 45 is depressed. If it is desired, however, to produce a continuous feed, or one which will permit the continuous flow of the sand as long as the pin 45 is held depressed, I provide in the bottom 27 of the cup or pocket 26 an aperture 47, so located that when the valve is in the closed position (shown in Figs. 3, 5, and 6) said aperture is above the end of the feed-pipe 18; but when the valve is moved to its other position, as shown in Fig. 7, said aperture is opposite and immediately below the end of the feed-pipe 18. When the parts are in the position shown in Fig. 7 it is obvious that a continuous flow of sand will be produced until the pressure on the operating-pin is removed and the weight returns the valve to its closed position, whereupon the flow of sand will cease. When this particular form of valve having the aperture 47 is employed, the cup or pocket 30 may be dispensed with, although its employment is still desirable as a means for insuring a supply of sand in case the aperture 47 becomes clogged or obstructed.

In order to provide for access to the interior of the valve-chamber to permit inspection of the valve or for any other purpose, I provide at one end of the valve-chamber an aperture 48, which is closed by a suitable cover 49, a packed joint 50 being formed between the cover and the face of the valve-chamber to form a water-tight joint between the two. The cover 49 may be secured by bolts 51, and in order to facilitate removal and replacement of the cover without entirely removing the nuts or screws, slots or notches 52 are provided at the top and bottom of the cover to receive the bolts 51. I may also provide each discharge-spout 15 with a guiding-spout 53 in order to insure the delivery of the sand at the most effective point.

It is obvious that the details of construction may be modified without departing from the principle of my invention. For instance, other operating mechanism than that which I have devised and shown may be employed, and in the particular mechanism set forth a spring may obviously be substituted for the weight for the purpose of returning the valves to their normal or closed positions. I therefore do not wish to be understood as limiting my invention to the precise construction hereinbefore described, and shown in the drawings.

I claim—

1. In a sand-box for car tracks of the character described, the combination with a hopper or reservoir having a substantially vertical sand discharge pipe or passage, of an oscillating valve having a cup shaped pocket into which the lower end of the pipe or passage extends but spaced away therefrom with the edges extended upward sufficiently to prevent the discharge of sand when in normal closed position and adapted to discharge when oscillated laterally, and to continuously discharge while maintained in such position, and a valve chamber completely inclosing said valve and provided with a discharge pipe, substantially as described.

2. In an apparatus of the character described, the combination, with a hopper or reservoir having a feed-pipe, of an oscillating valve provided with two cup-shaped pockets of differing length, the feed-pipe extending into the longer pocket, and the two pockets communicating with each other at one end, substantially as described.

3. In an apparatus of the character described, the combination, with a hopper or reservoir having a feed pipe or passage, of an oscillating valve comprising two chambers of differing length, the feed-pipe extending into the longer chamber, said longer chamber being provided with a transversely-inclined bottom, and the two chambers communicating at one end, substantially as described.

4. In an apparatus of the character described, the combination, with a hopper or reservoir provided with a feed-pipe having an inclined end, of an oscillating valve having a cup-shaped pocket provided with a curved bottom, said feed-pipe extending into said cup-shaped pocket and terminating some distance above the curved bottom thereof, substantially as described.

5. In an apparatus of the character described, the combination, with a hopper or reservoir having a feed-pipe, of an oscillating valve comprising two cup-shaped pockets of different length, into the longer of which the feed-pipe extends, said pockets communicating at one end, and a valve-chamber inclosing said valve and provided with an inclined or hopper bottom and a discharge-spout, substantially as described.

6. In an apparatus of the character described, the combination, with a hopper or reservoir having a feed-pipe, of an oscillating valve into which the feed-pipe extends, a valve-casing inclosing said valve and constructed in two separable parts, the meeting faces whereof are grooved to receive a packing located in said groove, substantially as described.

7. In an apparatus of the character described, the combination with a hopper or reservoir, of a valve-casing having a rabbeted seat in its upper portion, a feed-pipe having a hopper-shaped plate fitting in said rabbeted seat, and an oscillating valve arranged in said valve-casing and adapted to receive the end of the feed-pipe, substantially as described.

8. In an apparatus of the character described, the combination, with a hopper or reservoir having a feed-pipe, of an oscillating valve to receive said feed-pipe, a valve-casing inclosing said valve and feed-pipe and provided with an opening, and a removable cover for said opening, substantially as described.

9. In an apparatus of the character described, the combination, with hoppers having feed-pipes and oscillating valves to receive said feed-pipes, of a transverse shaft connected with said valves, means for automatically actuating said shaft in one direction to close said valves, and means for rocking said shaft in the opposite direction to open said valve, substantially as described.

10. In an apparatus of the character described, the combination, with hoppers having feed-pipes, of oscillating valves having cup-shaped pockets into which said feed-pipes extend without contact with the same, a rock-shaft connecting said valves, automatic means for actuating said rock-shaft to normally close said valve, and means for actuating said rock-shaft in the opposite direction to open said valves, substantially as described.

11. In an apparatus of the character described, the combination, with hoppers having feed-pipes, of oscillating valves provided with polygonal trunnions, a connecting rock-shaft having similarly-shaped extremities, and couplings between said shaft and trunnions, each consisting of a sleeve having a correspondingly-shaped aperture and a set-screw for securing said sleeve, substantially as described.

12. In an apparatus of the character described, the combination, with hoppers having feed-pipes, oscillating valves to receive said feed-pipes, and a rock-shaft normally actuated to close said valve and provided with a radial arm, of a bell-crank lever, a rod connecting said arm and bell-crank lever, and an operating-pin bearing on the bell-crank lever, the bell-crank lever being inclined to the pin when raised and at right angles thereto when depressed, substantially as described.

In testimony whereof I have hereunto signed my name in the presence of the two subscribed witnesses.

JOHN C. DUNER.

Witnesses:

PAUL CARPENTER,

DONALD C. WILLIAMS.